2,443,581

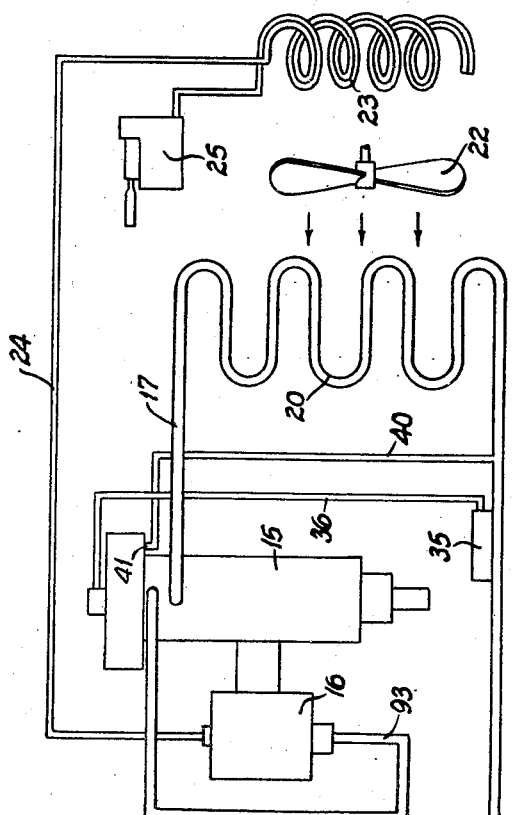
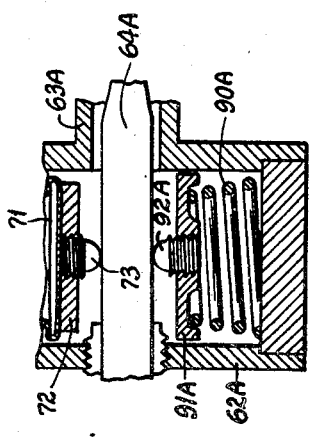
FIG. 2.
FIG. 4.
INVENTOR.
HAROLD T. LANGE
BY Robert B. Terry
ATTORNEY Patented June 15, 1948

UNITED STATES PATENT OFFICE 2,443,581

REFRIGERANT FLOW CONTROL MEANS

Harold T. Lange, Webster Groves, Mo., assignor to Spoehrer-Lange Co. Inc., St. Louis, Mo., a corporation of Missouri Application October 30, 1944, Serial No. 561,109

14 Claims. (Cl. 62—3)

This invention relates to improvements in refrigerant flow control means, and more particularly to an improved assembly of coacting, but at times independently functioning control features, adapted to effect a modulating temperature control of a refrigerated space; serving to limit suction pressures, and further to limit head pressures.

In many refrigeration installations, conditions render impractical the use of the usual types of electrical thermostatic controls; such conditions notably exist and the inadequacies of electric controls are aggravated in air conditioning systems for buses, refrigerated trucks, aircraft, and in stationary installations which for any reason are subjected to considerable vibration, as in certain marine installations, among others. It is a matter of experience that electrical contactors characterizing the usual control equipment are rendered extremely uncertain in performance when subjected to vibration in services of the kinds noted, so that regulation of the system is in many cases responsive solely to vibration effects, rather than temperature or pressure requirements. It is accordingly a major object of the invention to design a control system for refrigerant flow, which is free of effects of vibrations of the frequencies and amplitudes, encountered in vehicles and under other similar conditions.

A further object of the invention is attained in a simplified control system which is preferably entirely mechanical or hydromechanical in nature, and which avoids the use of all of the usual pressure switches, thermostats and the like.

Still another objective of the present invention is attained in a simplified structure for attaining, separately or coordinately, a temperature and head pressure control; a system in which the head pressure is definitely limited to predetermined safe values, and hence is particularly adapted to installations embodying a continuously operating compressor, as in bus or truck service, for example.

Yet another object of the invention is attained in a novel type of control whereby the flow of liquid refrigerant is regulated, if desired in accordance with other characteristics of the system or the cooled space, but irrespective of such other regulating factors, controlled in accordance with variations in head pressure in the system.

Yet another object of the invention is attained in an improved hydro-mechanical thermostatic control of expansion valve operation, in which is preferably utilized a motion-multiplying connection and which serves to eliminate the necessity for magnetic valves, electrical contact devices and the like.

A still further and important object of the invention is attained in a simplified control assembly in which, acting upon a thermostatic expansion valve, are two oppositely acting controls, one responsive to fluctuations in space temperature, and another responsive to variations in head pressure in the system, and in the most desirable present embodiment, an arrangement of these control means such that any effect of suction pressure on either control means, is substantially neutralized, hence functionally obviated.

A still further and important objective of the present improvements is attained in an improved compact mechanical or hydro-mechanical attachment for assembly to thermostatic expansion valves to effect a modulating temperature control for the purposes noted, and which may be manufactured and sold as an article of manufacture, ready for assembly with but a minimum service adjustment.

The foregoing and numerous other objects will more clearly appear from the following detailed description of a presently preferred embodiment of the invention, particularly when considered in connection with the accompanying drawing, in which:

Fig. 2 is a flow diagram illustrating the several major elements of a refrigerating system equipped with present improvements and arranged for space cooling;

Fig. 3 is a fragmentary transverse sectional elevation as taken along line 3—3 of Fig. 1; and Fig. 4 is a fragmentary sectional elevation of a modified form of control attachment.

Figure 1:
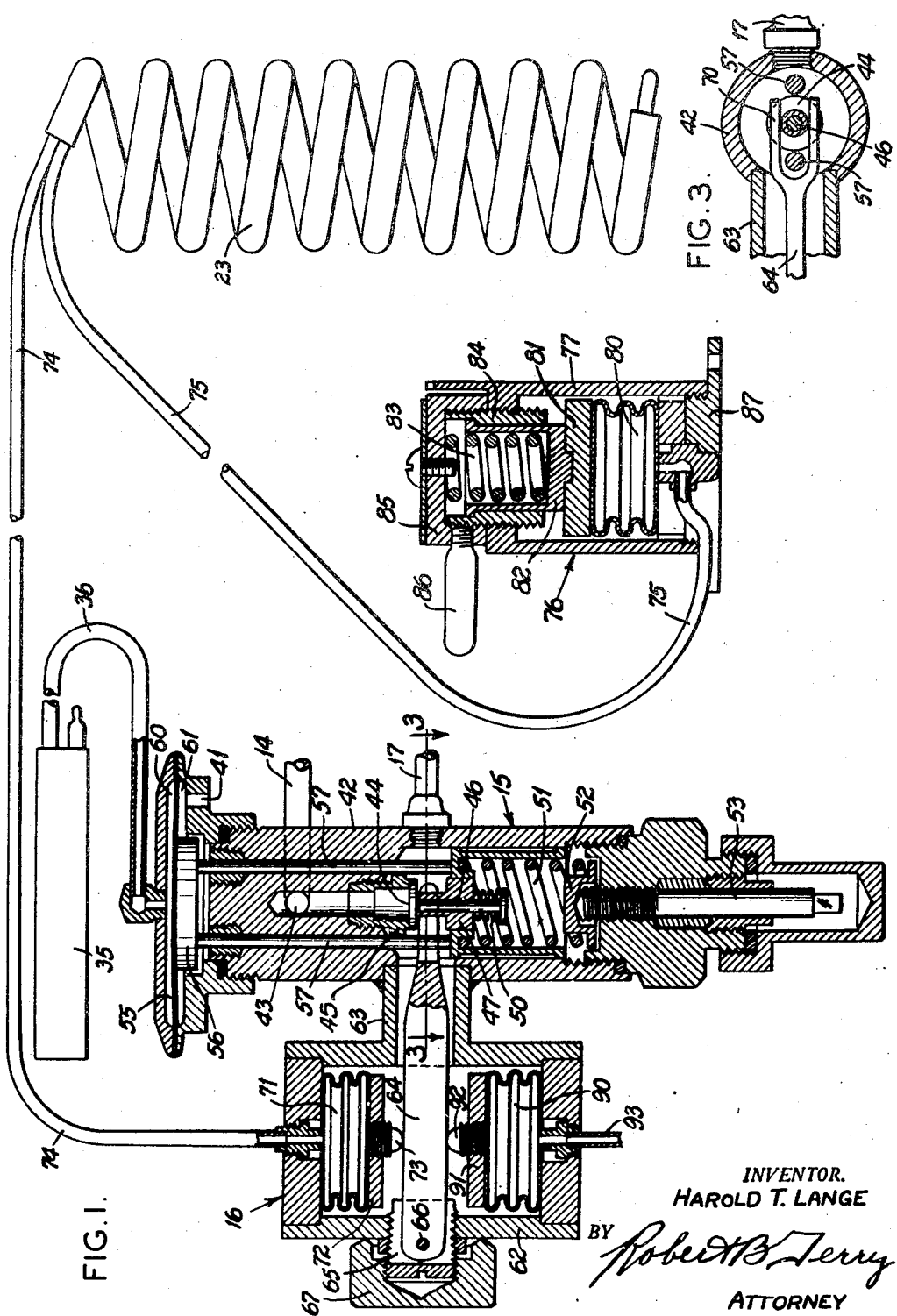
Fig. 1 is a vertical sectional elevation of a thermostatic expansion valve and an assembly of fluid motors, which, if desired, may be assembled as an attachment as shown, and further showing a temperature-sensitive bulb together with a pressure relief assembly employed in and as a part of a hydraulic circuit.

Referring now by characters of reference to the drawing, and first to Fig. 2, there is conventionally indicated at 10 a compressor, and a connection of fluid tubing 11 directed into a schematically shown condenser 12 which in turn communicates with a receiver 13 which through a line of tubing 14 is directed into a thermostatic expansion valve generally indicated at 15. This valve, although indicated diagrammatically in Fig. 2, is or may be of a type currently available to the trade and manufactured by Spoehrer-Lange Co. Inc., of St. Louis, Missouri, as their model No. OFE. The expansion valve 15 may thus be of itself of a well-known type, and will be hereinafter described in more detail. Secured to and in communication with the interior of the valve assembly 15, is an actuating attachment generally indicated at 16 and in which is embodied certain of the present improvements later to be described. Flow of liquid refrigerant outwardly of the valve assembly 15 is effected by a conduit 17 directed into an evaporator 20, thence through a return line of tubing 21, to the compressor 10 to constitute a closed system or flow circuit. A fan 22 driven by any suitable prime mover (not shown) may be employed for the circulation of air into or from the space to be cooled, into heat exchanging relation with the evaporator 20. A temperature-sensitive bulb system consisting in part of a coil of tubing generally indicated at 23, may be located in a suitable zone in the space to be cooled or otherwise sensitive to space temperature conditions, for example, just ahead of the fan 22. The nature and function of the temperature-sensitive unit 23 will be hereinafter explained in more detail, but the assembly may be noted, for the present, as embodying a hydraulic circuit connection through tubing 24, with the control assembly 16, in a manner later more clearly appearing. There is similarly shown in Fig. 2 a maximum-pressure - limiting and temperature - regulating device generally indicated at 25, and which will be referred to as to structure and purpose, in connection with the description of Fig. 1.

Systems embodying the preferred arrangement of elements to be described, were particularly designed for vehicles, such as buses, railway cars and trucks in which, because of practical difficulties in providing otherwise, the compressors are usually continuously operating, i. e., whenever the vehicle engine, being the usual source of power, is in operation. Accordingly, in order to prevent operation of the compressor on a vacuum when the temperature of the space is satisfied, there is provided in connection with the compressor, a by-pass circuit consisting of piping 30 and 31 in which is disposed a diaphragm-actuated by-pass valve shown by conventional legend only and indicated at 32. So that the motor element actuating this valve may be responsive to suction pressure in the system, a fluid controlling connection 33 is provided, and which is directed into a suitable zone of the refrigeration flow circuit; thus, since the automatic by-pass provision forms per se, no part of the present improvements, it is sufficient merely to note in connection with Fig. 2, that upon the attainment of a predetermined suction pressure, valve 32 is actuated by its motor element so that the compressor is unloaded, and although continuously operating, serves merely to circulate fluid in the circuit 21—10—31—32—30—21, and so operates at a favorable suction pressure.

It may be further noted that, although of itself conventional, the usual motor element of the thermostatic expansion valve 15 may consist of a diaphragm direct-connected to the valve, and responsive in one direction to evaporator pressure, and further responsive to temperature conditions in the return line from the evaporator, as through a usual bulb 35 connected through tubing 36 to a chamber adjacent and in part defined by the diaphragm of the expansion valve, it being understood as conventional that the bulb 35, tubing 36 and chamber adjacent the diaphragm are filled with a suitable expansive fluid for actuation of the fluid motor identified with the valve diaphragm.

A further advantageous provision, but which of itself apart from present combinations, does not constitute part of the present improvements is exemplified by a pressure equalizing connection 40, this length of tubing being connected into line 21 in the line of flow beyond evaporator 20, and communicating with a connection 41 directed into a chamber below the usual motor diaphragm of the expansion valve. This arrangement serves advantageously to maintain a pressure below the valve diaphragm which corresponds substantially to that in the return line 21.

Referring now to the structure of Fig. 1, a thermostatic expansion valve generally indicated at 15, is shown as including a barrel or body 42 into which is directed the supply line 14 which opens through a port 43 into a longitudinal bore in the upper portion of the body 42. Liquid flow through the valve is controlled by means of a valve proper 44 shown as a disc acting against a valve seat element 45, the valve 44 being provided with a depending stem 46 which operates slidably in a valve guide structure 47 and projects therethrough, and below or beyond the guide 47, the stem is surrounded by a light coil compression spring 50 which assists in opening the valve under certain conditions. The valve guide 47 is urged upwardly in well known manner by a relatively heavy coil compression spring 51, which through a spring abutment 52 and a threaded adjusting screw 53, is adjustable as to its effective loading. The spring 51, as is well known, serves to oppose the valve opening action of the fluid motor heretofore generally referred to, and which is identified with a diaphragm 55, a movable head member 56 adjacent the diaphragm and a pair of rigid rod elements 57 serving to communicate motion from the diaphragm 55 and head 56, to the guide structure 47, hence under certain conditions to permit and cause valve 44 to open away from valve seat element 45. The thermostatic expansion valve assembly proper was heretofore known in the trade, hence will require no further or detailed description. It may be noted however that the pressures in a chamber 60 above diaphragm 55, are influenced through bulb 35 and tube 36 in accordance with superheat conditions in line 21 as noted, while pressure conditions in the chamber 61 are kept equalized, through tube 40, with the pressure in the zone of connection of tube 40 into line 21.

Referring now more particularly to the structure, purpose and function of several of the control elements of present novelty, it will be noted that in the attachment generally indicated at 16 there are provided two fluid motors and connections therefrom for operation of the valve 44. This attachment consists in the example shown, of a T-shape housing 62 including a neck or connection 63 sealed into the body 42 of the valve assembly 15 in the region of the valve 44. A valve operating lever 64 is shown as located substantially horizontally and is pivotally carried by a threaded plug 65 through a pivot pin 66 therein, the plug being provided with a sealing cap 67. The lever 64 is provided with a forked end 70, the furcations of which straddle the nearest push rod 57 so as to be free of engagement therewith, and similarly the lever end 70 is preferably free of direct attachment to the valve 44 or its stem, but acts thereagainst solely by abutment. In the arrangement shown, lever 64 can act only to close and never to open the valve.

Located in the upper portion (Fig. 1) of the housing 62, is a fluid motor consisting of a flexible bellows 71 provided with a reinforcement plate 72 and a central rounded button 73 carried by the plate. Opening into the chamber of the bellows, is a small bore flexible tube 74, this tubing being extended as desired, into a zone either in or in any event, influenced by the temperature of the space to be cooled, and in such zone the tubing is conveniently formed into the spiral temperature-sensitive coil 23 heretofore mentioned. One of the paired coil elements leading out of the unit 23, is shown at 75, and is directed into the fluid chamber of a combined pressure-limiting and temperature-control assembly generally indicated at 76. This unit includes a housing structure 77 within which is disposed a fluid motor such as a bellows 80 provided with a plate 81 which will at times, depending upon space temperature, hence upon volume in the system 71—74—75—80—23, abut a spring holder and guide member 82 within which is housed a coil compression spring 83. The guide member is located in a threaded bushing 84 within a threaded adjusting cap 85, provided with an adjusting handle or arm 86. This valve assembly may include a suitable mounting base 87, and be located as desired for convenience.

By reference the system just described constitutes a hydro-mechanical thermostat which, as will appear, acts at times on the valve 44. The hydraulic system of this assembly is preferably a "solid" system, in that, as is preferred, no air or vapor space is allowed therein although any suitable, reasonably highly expansive liquid may be employed in this system, xylol having been found suitable for this purpose.

A second fluid motor is shown in the drawing (Fig. 1) located in the lower portion of the attachment casing 62, and consists of a bellows 90, a plate 91 and a central rounded button 92. It will be noted that the points of engagement of buttons 92 and 73 of the paired, opposed fluid motors of the attachment, engage lever 64 at directly opposite points, and that a line connecting these points extends across lever 64 in a zone so spaced from pivot 66 as to impart to the lever a motion-multiplying function. Relative lengths of the lever arms are not critical; although shown by the drawing, for clearness, as somewhat greater in ratio, a 1:2 arrangement will usually be adequate, in which the forked end 70 of lever 64 will have twice the travel of that zone engaged by elements 73 and 92.

It may further be noted as most desirable to employ identical bellows assemblies 71 and 90, whereby equal areas thereof or substantially so, are exposed to whatever pressure may exist in the chambers of elements 62 and 63, it being noted in the example shown that these zones are subject to the varying suction pressures of the refrigeration system. By virtue of the direct opposition and common zone of connection of the two bellows, the suction pressure effects acting on these two fluid motors will substantially neutralize each other, for a purpose hereinafter better appearing. It may here be briefly noted that the function of the fluid motor 90 is most importantly a dual one of modulating head pressures in the system, and of providing assurance that such head pressures will not exceed a predetermined maximum. Accordingly, the energization of the fluid motor identified with bellows 90 is accomplished by fluctuations of refrigerant head pressure in the system, and to this end there is provided a branch tube 93 connected into the refrigerant system, say beyond the receiver in the present example, and conveniently consisting of a branch line connected into line 14.

It should be noted as entirely feasible to utilize the control features heretofore described, individually, rather than conjointly for attainment of resultant effects. For example, if it be desired not to employ the head pressure limiting control identified with bellows 90 and connection 93, an arrangement such as shown by Fig. 4 may be employed. In this case substantially the same casing or housing structure 62—63 may be employed, as may also lever 64, the generally corresponding parts being indicated in Fig. 4 as 62A, 63A and 64A. In this case, operating below lever 64 and hence upwardly thereagainst, there is provided a coil compression spring 90A operating against an abutment or reinforcing plate 91A and a button 92A. The function of this modified form of control will be hereinafter referred to in more detail.

For convenience of description of the elements heretofore mentioned, frequent reference has been made to the specific showing of the drawing in reference to "upper" or "lower" locations in th assembly. It should be distinctly understood that no limitation as to vertical, horizontal or other specific arrangements of parts is thereby intended.

Although to those skilled in the art, the operation, functions and purposes of the present improvements will now have become apparent, there may be further referred to for completeness a simplified example in keeping with conditions encountered in normal practice. Let it be assumed that the adjustment spring 83 is regulated to balance a pressure in bellows 80 say of 220 p. s. i. gauge; that head pressure has attained a value of 230 lbs.; suction pressure at 50 lbs., and with a differential pressure against the disc 44, of 5 lbs. The leverage of element 64 being exemplified at 2:1, it will appear that an upward (Fig. 1) pressure is attained against element 64, of 230 lbs. plus 50 lbs. or 280 lbs. This pressure is, however, opposed by values of 50 lbs. plus 10 lbs. plus 220 lbs.; the resulting net pressure results in a balanced condition and the position of lever 64 and disc 44 will depend on the position of bellows 71 as determined by the temperature, hence volume of the hydraulic fluid in the thermostatic system. Accordingly it will now appear that, with this exemplary head pressure or any other head pressure below 230 lbs., the temperature of the unit 23, will determine a variably permitted degree of opening of valve disc 44, assuming superheat conditions in the system such that the valve is thereby permitted to open. In case there is any change in suction pressure, no modulating or controlling effect will result therefrom, since the upward and downward pressure say of 50 lbs. will be equally impressed on the opposed fluid motors, and thus the acting and reacting pressures within the element 62 will functionally neutralize each other.

Assuming now a head pressure in excess of 230 lbs., the spring 83 will be compressed and bellows 80 will increase in volume; concurrently liquid will be drawn from the bellows 71, and lever 64 will be actuated in a direction to close valve 44 against the seat element 45, and limit further increase in head pressure by stopping flow of refrigerant and thus unloading the compressor.

Thus in the example given, under any instant head pressure below 230 lbs., the position of disc 44 will be affected only by temperature in the space under refrigeration.

In the event it is desirable to limit the head pressure to some different value, say some value other than 230 lbs., spring 83 is adjusted to begin to compress at some other desired pressure value. The effect of the differential pressures against the valve disc 44 is proportional to the current head pressure, and probably to some very slight extent to suction pressure, although this is of distinctly minor effect, if of any consequence, thus rendering variations in suction pressure of little effect on the balance of this system. It may be noted that the valve disc 44 is of a very minor area in comparison with the areas of the bellows elements of the motor units, say only five percent of such area, hence the variation of 50 lbs., in suction pressure, being an extreme variation, would change the 10 lb. pressure in the foregoing illustration, only to the extent of approximately 3 lbs.

Let it be assumed that under extreme conditions, the temperature of the hydraulic system 23—74—75—76 increases beyond a normal value and the volume of the liquid therein thus increases to an extent that bellows 71 has expanded to its limit, and has actuated lever 64 and urged the bellows 90 to a collapsed position. In such case the pressure of fluid will increase say to 220 lbs. thus compressing spring 83, allowing the diaphragm 80 to increase in volume and to absorb the increased volume of hydraulic fluid. In case the spring 83 were adjusted to begin to compress at any other reasonable pressure than say 220 lbs., then the effect described will occur at either higher or lower pressure than the 220 lbs. mentioned.

It should be noted as entirely feasible, if it be desired, to utilize an arrangement essentially the same as parts of the attachment 16 (Fig. 1) but eliminating the head pressure limiting control, and utilizing only the temperature control system. In such case the arrangement may be as shown by Fig. 4, heretofore structurally described, in which it is seen that bellows 90 and connections are eliminated and replaced by a coil compression spring of such characteristics as to exert pressure against lever 64 and bellows 71, which pressure is at all times higher than the differential pressure against valve disc 44. In this structure, the exact pressure setting could be effected at the time of manufacture, and would require no change in service.

It will have appeared that the apparatus constituting examples of the present improvements will serve in improved manner and as an exceedingly simple control structure for safely limiting pressures and controlling refrigerating effects in systems of the particular types earlier referred to. The system as described advantageously makes provision for control influence on an expansion valve in accordance with a principle believed novel, namely, that individual factors of influence may, if dominating, control the flow of refrigerant, or under other conditions, the fact and extent of expansion valve opening will depend upon the effects of as many as three control factors, namely, pressures reflective of superheat conditions, head pressure in the system, and temperature of refrigerated space.

Actual usage of the system herein described indicates its full adaptability for each and all of the purposes mentioned, and with full attainment of each of the several objectives of the invention. Numerous variants in structural embodiment being possible, the foregoing detail of description is to be understood solely in an instructive sense, and not in any manner to limit the full intended scope of claims hereunto appended.

I claim as my invention:

1. In a refrigerating system, a compressor, a condenser, an evaporator, conduits whereby said elements are connected in a closed system, a thermostatic expansion valve in said system, a fluid motor having a connection with the expansion valve including a motion-multiplying element, and a conduit establishing fluid connection between said fluid motor and a zone in the system between the condenser and evaporator thereof, whereby to subject said motor element to fluid pressures fluctuating in proportion to fluctuations of head pressures in the system.

2. In a refrigeration system of compressor-condenser-evaporator type, in which the evaporator is arranged in cooling relation to a space, a flow control valve for liquid refrigerant together with a combination of valve control means operable in response to changes in head pressure in said system, and valve control means arranged mechanically to act on said valve in response to temperature of the space to be cooled by the system.

3. In a refrigeration system of compressor-condenser-evaporator type, a refrigerant flow control valve, control means for said valve responsive to superheat and control means for said valve arranged to effect control movements thereof in direct response to changes in head pressure in the system.

4. In a refrigeration system for cooling a space, a refrigerant flow control valve for varying the supply of liquid to an evaporating portion of the system, valve actuating means including a fluid motor and a fluid conduit from said motor and connected into a zone of the refrigeration system such as to subject said motor to varying head pressures in the system, valve actuating means responsive to temperature of the refrigerated space and including a fluid motor, and a liquid-filled tube directly influencing the last said motor, each of said motors being operatively related to the control valve.

5. The combination and arrangement of elements as recited in claim 4 but further characterized by the provision of a mechanical connection common to said fluid motors, and serving for the translation of motion therefrom, to the refrigerant control valve.

6. In a refrigeration system arranged for space cooling, and including a compressor, a condenser and an evaporator, together with an expansion valve in a closed refrigerant circuit, a superheat control including a valve actuating motor and fluid pressure actuating means therewith responsive to superheat in the system; a second fluid motor having an operating connection with said valve and an energizing fluid connection between the last said motor and a head pressure zone of the system.

7. In a refrigeration system arranged for cooling a space, and including a compressor, a condenser, an evaporator arranged in a closed circuit constituting a first fluid system, a refrigerant flow control valve, a valve operating member, a second fluid system including a fluid motor, a portion of the second said system being located to act responsively to temperature of the space under refrigeration, a third fluid system including a motor member connected into the first system so as to act in response to variations in head pressure therein, said motor members being arranged to act in opposing relation, and connections from the motor members to the refrigerant control valve.

8. The combination and arrangement of elements as set forth in claim 7 but further characterized in that the connections between said motor members and the refrigerant control valve include a motion-multiplying element which is functionally common to said fluid motor members.

9. The combination and arrangement of elements as recited by claim 7 but further characterized in that said fluid motor members are substantially equally subjected to suction pressure in the system.

10. In a refrigeration system arranged for cooling a space, and including a compressor, a condenser and an evaporator arranged in a connected system, a refrigerant flow control valve in said system, a valve operating member, a fluid control system including a fluid motor, a portion of the last said system being responsive to temperature of the space under refrigeration, an additional fluid control system including a fluid motor connected into the last said system so as to act in response to variations in head pressure therein, said fluid motors being arranged to act in opposing relation, and connections from the motors to the refrigerant control valve so arranged in respect to the valve as to constitute a valve operating connection only in one direction of movement of said valve and being substantially free of influence on the valve under conditions requiring an opposite movement of the valve.

11. In a refrigeration system arranged for cooling a space, and including a compressor, a condenser and an evaporator arranged in a connected system, a refrigerant flow or expansion control valve, a valve operating member, a first fluid control system including a fluid motor and arranged for actuating the valve in response to variation in superheat conditions in the refrigeration system, a second fluid control system including a fluid motor, a portion of said second system being responsive to temperature of the space to be cooled, a third fluid system including a motor member, said third system being connected into the refrigeration system so as to act in response to variations in head pressure therein, the said fluid motors of said second and third systems being arranged to act in opposing relation and being equally subjected to effects of varying suction pressures in the refrigeration system, a motion-translating connection between the fluid motors of said second and third systems and the valve actuating member, and being connected in lost-motion relation thereto in such manner that either of the said fluid motors is enabled to operate the refrigerant flow control valve in closing direction only, and a combined pressure-relief and temperature-adjusting device in the second said fluid system.

12. In a refrigeration system for cooling a space, a refrigerant flow control valve for varying the supply of liquid to an evaporating portion of the system, valve actuating means including a fluid motor and a fluid conduit from said motor and connected into a zone of the refrigeration system such as to subject said motor to varying head pressures in the system, valve actuating means responsive to temperature variations of the refrigerated space and including a fluid motor and a liquid-filled tube directly influencing the last said motor, each of said motors having a common operative connection to the control valve, and a device connected into said liquid-filled tube for predetermining a range of control valve actuation which is dominated by temperature variations in the refrigerated space.

13. A liquid flow control assembly for use in a space cooling refrigeration system, said assembly including a refrigerant flow control valve in combination with means for operating said valve in response to superheat conditions in the refrigeration system, valve actuating means responsive to head pressure variations in the refrigeration system, valve actuating means responsive to temperature variations of the cooled space, means providing a common operating connection between said last two valve actuating means and said flow control valve, and means for permitting one of said last two valve actuating means to dominate operation of said common means.

14. A liquid flow control assembly for use in a space cooling refrigeration system, said assembly including a refrigerant flow control valve in combination with means for operating said valve in response to superheat conditions in the refrigeration system, first valve actuating means responsive to head pressure variations in the refrigeration system, second valve actuating means responsive to temperature variations of the cooled space, means providing a common operating connection between said first and second valve actuating means and said flow control valve, and means for permitting said second means to dominate operation of said common connection below a predetermined head pressure in the refrigeration system.

HAROLD T. LANGE.

REFERENCES CITED

The following references are of record in the file of this patent:

UNITED STATES PATENTS

| Number | Name | Date |
| --- | --- | --- |
| 920,392 | Rider | May 4, 1909 |
| 2,019,724 | Otto | Nov. 5, 1935 |
| 2,191,925 | Kaufman | Feb. 27, 1940 |
| 2,236,191 | Wolfert | Mar. 25, 1941 |
| 2,258,458 | Lange | Oct. 7, 1941 |
| 2,304,316 | Newton | Dec. 8, 1942 |
| 2,319,993 | Kaufman | May 25, 1943 |
| 2,320,055 | Stickel | May 25, 1943 |
| 2,367,305 | Newton | Jan. 16, 1945 |
| 2,410,795 | Dillman | Nov. 5, 1946 |

Disclaimer 2,443,581.—*Harold T. Lange*, Webster Groves, Mo. REFRIGERANT FLOW CONTROL MEANS. Patent dated June 15, 1948. Disclaimer filed Nov. 1, 1950, by the assignee, *Sporlan Valve Company*; the inventor consenting.

Hereby enters this disclaimer to the subject matter of each of claims numbered 2, 3, 6, 7, 10 and 13 of said patent.

[*Official Gazette January 23, 1951.*]